Jan. 19, 1971                R. E. COOK                3,555,843
                      WATER CHILLING UNIT CONTROL
                         Filed July 23, 1969
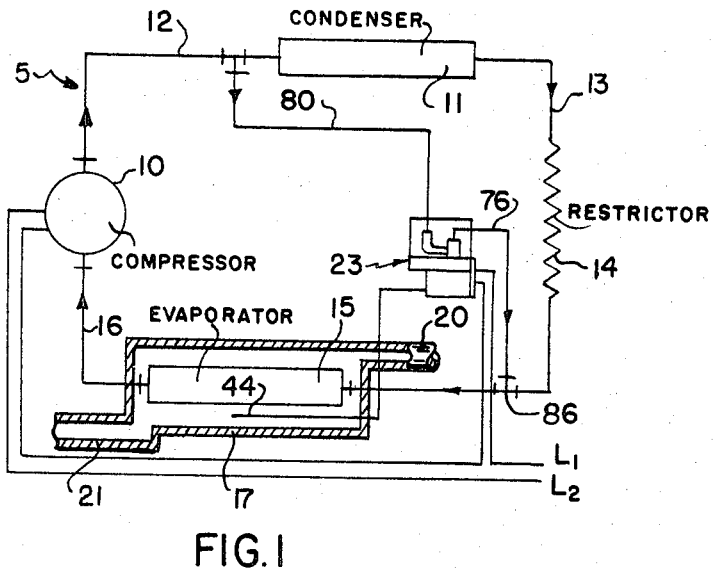
FIG.1
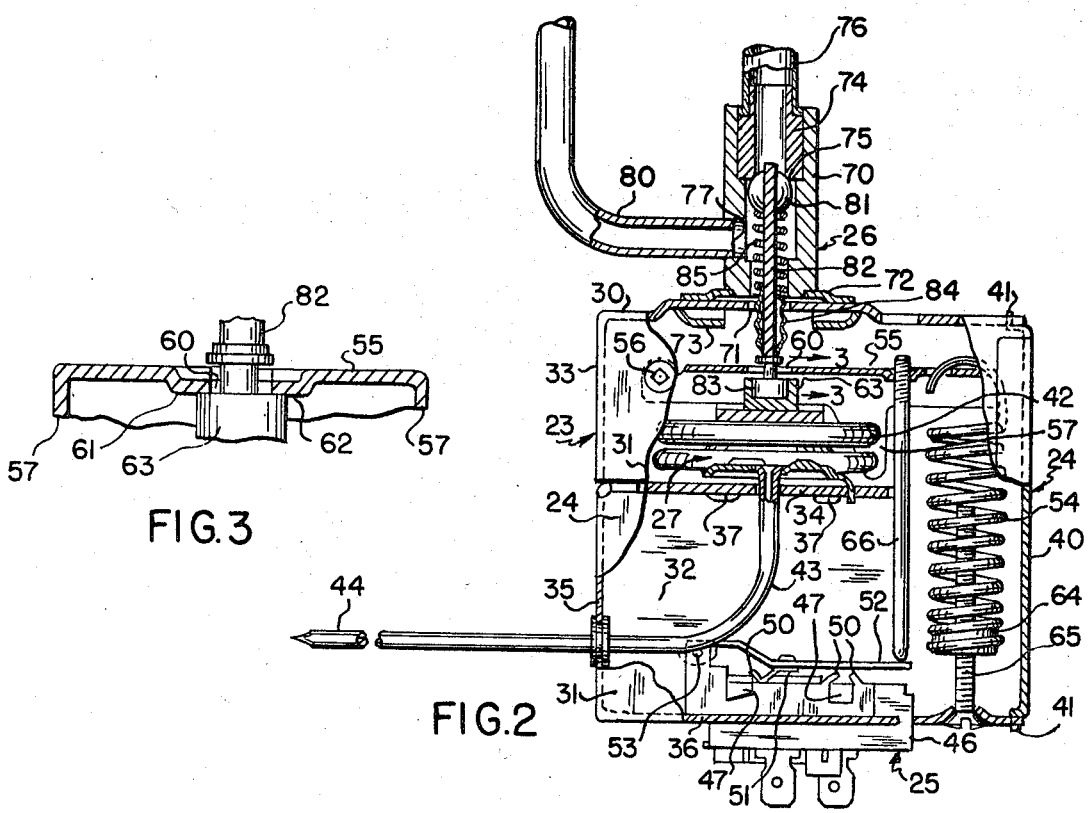
FIG.3
FIG.2
INVENTOR
RUSSELL E. COOK
BY
Watts, Hoffmann, Fisher & Heinke
ATTORNEYS

United States Patent Office 3,555,843
Patented Jan. 19, 1971

3,555,843
WATER CHILLING UNIT CONTROL
Russell E. Cook, Columbus, Ohio, assignor to Ranco Incorporated, Columbus, Ohio, a corporation of Ohio
Filed July 23, 1969, Ser. No. 843,993
Int. Cl. F25b 41/00
U.S. Cl. 62—196                    2 Claims

ABSTRACT OF THE DISCLOSURE

An electric motor powered compressor-condenser-evaporator type water cooler refrigerating system is controlled by a switch and valve actuated by a power element responsive to water temperature adjacent the evaporator, the valve bypassing progressively larger proportions of refrigerant around the evaporator during a cooling cycle to gradually reduce the cooling efficiency of the evaporator. This control prevents short cycling of the system and effects rapid unloading of head pressure.

BACKGROUND OF THE INVENTION

The present invention relates to water coolers of the type comprising a mechanical refrigeration system adapted to chill water which is then discharged through a drinking fountain to provide individual drinking needs. One problem with water coolers of the type mentioned is that of providing sufficient chilled water to serve frequent usage of the water fountain and yet minimize the physical dimensions of the equipment. To this end it is desirable to provide sufficient chilling capacity in the evaporator of the refrigerating system to adequately chill water as it passes to the fountain and thereby eliminate bulky water storage tanks and the like.

An object of the present invention is the provision of a control apparatus for a refrigerating system of a drinking fountain of the type mentioned which comprises a switch to control the operation of the refrigerant compressor motor and a valve to control flow of liquid refrigerant around the expansion valve for the evaporator to reduce the efficiency of the evaporator as the temperature of the water chilled is reduced to a minimum desired temperature, at which temperature the refrigerating cycle is terminated by the switch. The improved control apparatus makes possible the provision of a refrigerating system having a cooling capacity sufficient to rapidly chill water and yet does not operate on short cooling cycles. Thus, the frequency of starting and stopping of the refrigerant compressor and the attendant wear and tear on the refrigerating system components and the control therefor is substantially reduced. Furthermore, the valve provides for rapid equalization of pressures in the refrigerating system following termination of a refrigerating cycle which obviates high starting torque loads on the motor and compressor.

Other objects and advantages of the invention will be apparent from the following description of a preferred form of the invention, reference being made to the accompanying drawings wherein:

FIG. 1 is a schematic view of a water cooler embodying the invention;

FIG. 2 is a broken away view of a control apparatus in the refrigerating system of the water cooler; and FIG. 3 is a sectional view taken substantially along line 3—3 of FIG. 2 and on a larger scale.

Referring to FIG. 1 the refrigerating system for cooling water supplied to a drinking fountain is shown at 5. The water cooler is of a conventional construction which has a water bubbler type fountain operated by a hand or foot operated valve and for sake of simplicity, only a fragment of the water cooler structure appears in the drawing. Water may be supplied to the fountain from any suitable source, such as a city main, and the water passes in heat exchange relation with the evaporator or cooling unit of the refrigerating system just prior to passing through the valve for the water fountain. The water main and valve are not shown.

The refrigerating system 5 includes an electric motor driven compressor 10 which discharges refrigerant into a condenser 11 through a conduit 12. Refrigerant is condensed in the condenser and then passes through a conduit 13 to a suitable restrictor 14 upstream of an evaporator 15. The outlet of the evaporator 15 is connected to the suction side of the compressor 10 by a conduit 16.

The evaporator 15 may be of any suitable construction, such as a coiled tube, substantially enclosed within an outer tube or jacket 17 which forms a part of the water passageway from a city main to the valve of the water fountain. The jacket 17 includes an inlet 20 and an outlet 21 for the passage of water therethrough. The water is chilled by the evaporator 15 as it passes through the jacket 17.

In accordance with the present invention the operation of the compressor 10 is regulated by a control apparatus 23 to operate intermittently and produce water cooling cycles so that suitably chilled water will be available at all times at the drinking fountain.

To conserve space occupied by the water cooler it is desirable to maintain the volume of the water jacket 17 at a minimum. This minimizing of volume of the water jacket reduces the quantity of stored chilled water available at the water fountain and consequently the cooling capacity of the refrigerating system is relatively high to adequately chill water flowing along the evaporator walls during heavy usage of the drinking fountain. The cooling capacity of the refrigeration system is such that if the usage of the drinking fountain was light, a short cooling cycle would result. Consequently frequent cycling or operation of the compressor would result causing high consumption of power and excessive wear of the equipment.

According to the present invention, the apparatus 23 includes a valve mechanism for bypassing a portion of the high pressure refrigerant around the restrictor 14 so as to reduce the effectiveness of the evaporator 15 as the water temperatuee is lowered towards a given degree.

Referring to FIG. 2, the apparatus 23 comprises a suitable frame or housing 24 which supports an electric snap switch 25, a valve mechanism 26 and a thermally responsive power element 27 in accordance with the temperature of water surrounding the evaporator 15. The apparatus 23 is adapted to initiate operation of the compressor 10 when the temperature of the water passing over the evaporator 15 reaches 40° F. for example. At the same time the valve 26 is in a closed condition so that the entire flow of refrigerant to the evaporator is through the condenser 11 and restrictor 14. Under these conditions the evaporator is operating at maximum capacity. As the temperature of the water undergoing chilling by the evaporator is lowered from 40° F. the valve 26 is gradually opened to bypass refrigerant from the discharge side of the compressor to the inlet of the evaporator downstream from the restrictor 14. This introduction of hot gaseous refrigerant into the evaporator reduces the cooling capacity of the evaporator. Finally, when the temperature of the water sensed by the thermal element 27 is reduced to 36° F. the switch 25 opens the compressor circuit to terminate the water chilling cycle. At this point the valve 26 is open to its fullest extent. Upon termination of operation of the compressor the pressures on opposite sides of the compressor are quickly equalized through the open valve 26 and minimizes the starting torque requirement for a succeeding cooling cycle. As the water temperature about the evaporator increases towards 40° F. the valve 26 is gradually closed. At 40° F. the compressor is again operated.

Referring more specifically to FIGS. 2 and 3 wherein the details of the control apparatus 23 are shown, the housing 24 is formed by a generally U-shape sheet metal member having a top wall 30, front and rear side walls 31, 32 and an end wall 33. The end wall 33 terminates considerably short of the lower extremities of the side walls 31, 32. The lower portion of the housing, as viewed in the drawings comprises a C-shaped frame member formed of sheet metal and having an upper wall 34, an end wall 35 and a lower wall 36. The wall 34 is inserted between the side walls 31, 32 and is retained in position by guide lugs 37 struck from the side walls 31, 32. Only the lugs 37 on the wall 32 appear in the drawings. The walls 33 and 35 form one side of the housing 24 and the wall 36 forms the bottom wall. A closure plate 40 forms the opposite side wall and is secured between the top and bottom walls 30, 36 respectively by tongue and slot connections as indicated at 41.

The thermal element 27 is attached to the bracket wall 34 and is comprised of a metal bellows 42 having a capillary tube 43 attached thereto and which extends through an opening in side wall 35 with an end section 44 thereof disposed in the jacket 17 in a position to be responsive to the temperature of water as it enters into contact with one end of the evaporator 15. The capillary tube 43 and bellows 42 contain a suitable refrigerant in vapor form so that the pressure in the bellows corresponds to the temperature at the section 44 of the capillary tube. As is well understood in the art, the section 44 of the capillary tube will normally be the coldest point of the thermal element and the pressure of the refrigerant in the capillary tube is determined at that point. Thus, as the temperature of the section 44 increases and decreases the pressure within the bellows 42 will increase and decrease correspondingly. The resultant expansion and contraction of bellows 42 actuates the switch 25 and valve 26.

The switch 25 is a conventional snap acting type mounted inside a casing 46 which is preferably formed of molded insulated material. The casing 46 is secured in an opening in the housing wall 36 by lugs 47 received in recesses formed in turned portions of the wall 36. The lugs 47 are retained in the recesses by stake portions 50.

The switch 25 includes an operating member 51 which is normally biased upwardly as viewed in the drawings and is engaged by an actuating lever 52. The lever 52 is pivoted on a pin 53 supported between two upstanding lugs formed by the inturned portions of the wall 36. The actuating lever moves clockwise about its pivot to depress the operating member 51 to open the switch. As the actuating lever 52 moves counterclockwise the operating member 51 follows the lever and closes the switch.

The actuating lever 52 is moved in opposite directions about its pivot by the bellows 42 and a tension spring 54 which is arranged to load the bellows 42. A bellows lever 55 is pivoted on a pin 56 which is supported in openings in the side walls 31, 32 of the housing 24. The lever 55 is formed of a channel-shaped sheet metal member and the sides thereof have oppositely positioned projections 57 which are arranged to engage the bracket wall 34 and limit clockwise movement of the lever. Only one projection 57 appears in the drawing. The yoke portion of the lever 55 has an opening 60 therethrough and ridges 61, 62 are formed on opposite sides of the opening and form bearing points which are engaged by a button 63 attached to the end wall of the bellows 42.

One end of the spring 54 is attached to the free end of lever 55 by hooking the spring to the lever, as shown, and the opposite end of the spring is threaded onto a nut 64. The nut 64 is in turn threaded on a screw 65 which is rotatably supported in an extruded opening through the bracket wall 36. The tension of the spring 54 is adjusted by rotating the screw 65 in one direction or the other. The tension of the spring 54 determines the pressure inside the bellows 42 required to operate the switch 25 and valve 26, as is well understood in the art.

The lever 55 is connected with the switch actuating lever 52 by a rod 66. One end of the rod 66 is threaded into an extruded opening through the lever 55 and the opposite end is rounded and rests against the switch actuating lever 52. The effective length of the rod 66 can be adjusted by threading it more or less into the lever 55. This adjustment permits calibrating temperature responsive operation of the switch.

The valve 26 comprises a tubular body 70 attached to the upper wall 30 of the housing 24 in registration with an opening 71 through the wall. As shown, the housing 70 has a collar 72 attached thereto which is secured to the wall 30 by extending tabs 73 on the collar through slots in the wall.

The valve body 70 has an internal sleeve 74 in the upper end thereof which provides a valve seat 75. The valve seat 75 forms the outlet port of the valve and an outlet tube 76 is suitably attached in the upper end of the bore of the valve body. An inlet opening 77 is formed on the side of the valve body 70 below the valve seat and an inlet tube 80 is secured in the opening.

The valve seat 75 is adapted to be closed by a valve ball 81 which is attached to the end of a valve stem 82. The valve stem 82 includes a cylindrical head 83 which is received in a socket formed in the button 63 of the bellows 42.

A flexible seal 84, in the form of a corrugated metal sleeve 84 surrounds the stem and is brazed at one end to the stem and the other end to the sides of the bore in the valve body 70. This seal permits longitudinal movement of the stem without leakage.

The valve stem 82 is urged to the valve closing position by a coil spring 85 which surrounds the stem with one end engaging in an annular groove about a reduced end of the housing 70. The area of the valve seat 75 is approximately the same as the effective cross sectional area of the valve stem and seal 84 exposed to refrigerant entering the valve body so that the fluid pressure in the valve body tending to close the valve is counterbalanced by tending to open the valve. Consequently the force tending to close the valve is provided by the spring 85.

The inlet tube 80 is connected to the conduit 12 upstream of the condenser 11. The outlet tube 76 is connected into the refrigerating system betwen the restrictor 14 and the inlet of the evaporator 15 at 86.

In calibrating the control mechanism the tension of the spring 54 is adjusted so that the bellows 42 moves the valve member 81 to close the seat 75 when a temperature of 40° F. is present at the section 44 of the capillary tube. The rod 66 is then adjustably positioned so that the switch 25 will be moved to closed position.

It will be seen that in operation as the pressure within the bellows 42 decreases the spring 54 causes the bellows 42 to gradually collapse which opens the valve seat 75 and shifts the switch actuating lever 52 towards the switch opening position. When the bellows 42 collapses to a point corresponding to a temperature of 36° F. at the section 44 the switch 25 opens to terminate operation of the compressor.

It will be apparent that by the invention just described a refrigerating system for water coolers is provided which has sufficiently large capacity to furnish chilled water under all conditions of usage and yet short operating cycles of the mechanism is eliminated.

I claim:

1. In a refrigerating system for chilling water fed to a drinking fountain or the like: an electric motor driven compressor, a condenser and an evaporator connected in a refrigerant circulating circuit, a refrigerant restrictor means in said circuit between said condenser and evaporator, a water supply conduit means for said fountain including a jacket surrounding a major portion of said evaporator; and control apparatus for said system comprising means including a valve for directing refrigerant discharged from said compressor into said evaporator and bypassing said condenser and said restrictor means, an electric switch for controlling operation of said compressor; and means responsive to temperature of water in said jacket for actuating said valve means and said switch and operative to close said valve means and said switch in response to a predetermined temperature of water and to gradually open said valve means in response to decrease in temperature of water to a lower predetermined temperature and to open said switch at said predetermined lower temperature.

2. In a refrigerating system as defined in claim 1 further characterized by a single expansible thermally responsive element arranged to operate said valve and said switch.

References Cited
UNITED STATES PATENTS

| 2,344,215 | 3/1944 | Soling | 62—196 |
| 3,097,503 | 7/1963 | Lieberman | 62—196 |

MEYER PERLIN, Primary Examiner

U.S. Cl. X.R.

62—201, 226